(12) United States Patent
Li et al.

(10) Patent No.: US 10,585,890 B2
(45) Date of Patent: Mar. 10, 2020

(54) GENERATION OF QUERY EXECUTION PLANS

(71) Applicant: International Business Machines Corporation, Armonk, NY (US)

(72) Inventors: Shuo Li, Beijing (CN); Ke Wei Wei, Beijing (CN); Xin Ying Yang, Beijing (CN); Chen Xin Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 15/335,724

(22) Filed: Oct. 27, 2016

(65) Prior Publication Data

US 2018/0121507 A1    May 3, 2018

(51) Int. Cl.
*G06F 16/2453* (2019.01)
*G06F 16/14* (2019.01)

(52) U.S. Cl.
CPC ...... *G06F 16/24545* (2019.01); *G06F 16/148* (2019.01)

(58) Field of Classification Search
CPC .......................... G06F 16/24545; G06F 16/148
USPC ........................................................ 707/718
See application file for complete search history.

(56) References Cited

U.S. PATENT DOCUMENTS

| | | | |
|---|---|---|---|
| 6,366,901 B1 | 4/2002 | Ellis | |
| 6,421,663 B1 | 7/2002 | Chen et al. | |
| 7,167,848 B2 | 1/2007 | Boukouvalas | |
| 8,645,356 B2 | 2/2014 | Bossman et al. | |
| 9,063,973 B2 | 6/2015 | Bossman et al. | |
| 9,256,643 B2 | 2/2016 | Alpers et al. | |
| 2004/0148420 A1* | 7/2004 | Hinshaw | G06F 16/273 709/231 |
| 2005/0027701 A1 | 2/2005 | Zane | |
| 2010/0010962 A1* | 1/2010 | Sarapuk | G06F 8/443 707/E17.001 |
| 2013/0262435 A1* | 10/2013 | Bossman | G06F 16/24542 707/716 |
| 2015/0088857 A1 | 3/2015 | Lee et al. | |
| 2015/0278276 A1* | 10/2015 | Konik | G06F 16/116 707/715 |
| 2015/0310066 A1 | 10/2015 | Beavin et al. | |

OTHER PUBLICATIONS

Borovica-Gajic et al.; "Smooth Scan: Statistics-Oblivious Access Paths"; <https://infoscience.epfl.ch/record/203706/files/ICDE15_research_121.pdf>.

* cited by examiner

*Primary Examiner* — Evan Aspinwall
(74) *Attorney, Agent, or Firm* — Erik K. Johnson

(57) ABSTRACT

Aspects of the present disclosure relate to an approach for generating query execution plans for a database query. A computer-implemented method comprises determining whether a size of a file to be generated during execution of a database query is variable in response to obtaining the database query. The method further comprises determining a plurality of ranges for the size of the file in response to determining that the size of the file is variable. The method further comprises generating a plurality of query execution plans corresponding to the plurality of ranges. Accordingly, a plurality of query execution plans corresponding to different file sizes can be generated for the database query, and an efficient and cost effective query execution plan may be selected based on the actual file size during the execution of the database query.

18 Claims, 8 Drawing Sheets

GENERATION OF QUERY EXECUTION PLANS

BACKGROUND

Databases are generally used to store data for various applications, including commercial, industrial, technical, scientific and educational applications. Access to the data is usually provided by a "database management system" (DBMS) consisting of an integrated set of computer software, which allows users to uses a structured query language (SQL) statement to interact with databases and provides access to some or all of the data included in the database.

Generally, the DBMS contains an optimizer to perform query optimization on each query. The optimizer considers the possible query execution plans for a query statement and attempts to determine which of those query execution plans will be efficient and cost effective. Generally, an SQL query often generates one or more files (for example, work files) to store temporary result tables while performing the query, and the optimizer usually guesses the size of the generated file and provides one query execution plan based on the statistics information.

SUMMARY

In an aspect of the disclosure, a device is provided. The device includes a processing unit and a memory coupled to the processing unit and storing instructions thereon. The instructions may be executed by the processing unit to perform acts including: in response to obtaining a database query, determining whether a size of a file to be generated during execution of the database query is variable; in response to determining that the size of the file is variable, determining a plurality of ranges for the size of the file; and generating a plurality of query execution plans corresponding to the plurality of ranges.

In another aspect of the disclosure, a computer-implemented method is provided. The method comprises: in response to obtaining a database query, determining whether a size of a file to be generated during execution of the database query is variable; in response to determining that the size of the file is variable, determining a plurality of ranges for the size of the file; and generating a plurality of query execution plans corresponding to the plurality of ranges.

In yet another aspect of of the disclosure, a computer program product is provided. The computer program product is tangibly stored on a non-transient machine-readable medium and comprises machine-executable instructions. The instructions, when executed on a device, cause the device to: in response to obtaining a database query, determine whether a size of a file to be generated during execution of the database query is variable; in response to determining that the size of the file is variable, determine a plurality of ranges for the size of the file; and generate a plurality of query execution plans corresponding to the plurality of ranges.

According to embodiments of the present disclosure, a plurality of query execution plans corresponding to different file sizes can be generated for a database query. An efficient and cost effective query execution plan may be selected from the plurality of query execution plans based on the actual file size during the execution of the database query. By selecting a corresponding query execution plan based on the actual file size, the selected query execution plan can have performance or efficiency benefits. Various operations are provided to determine whether a file size is variable, thereby having performance or efficiency benefits such as accuracy in determining the variability of file size. Also, duplicate query execution plans may be combined for processing efficiency or performance.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
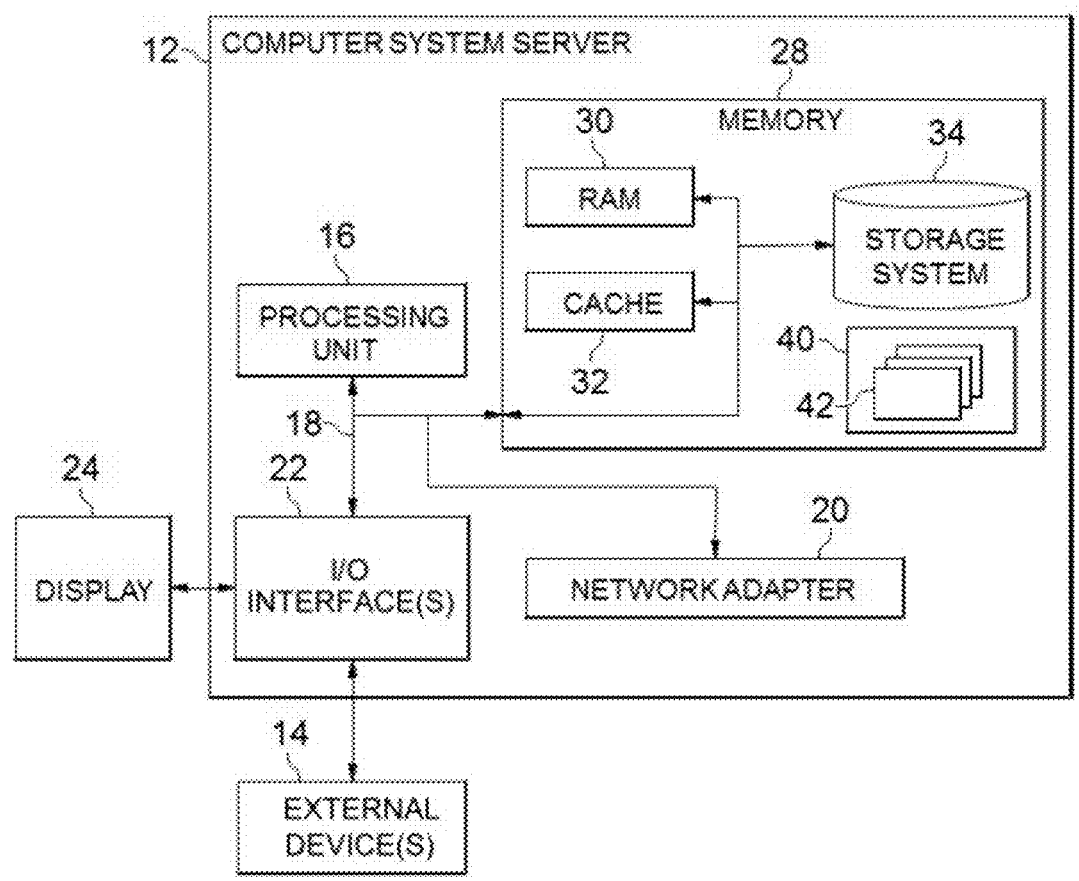
FIG. 1 is a block diagram of a computer system/server suitable for implementing embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure may be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as open terms that mean "includes, but is not limited to". The term "a" is to be read as "one or more" unless otherwise specified. The term "based on" is to be read as "based at least in part on". The term "one embodiment" and "an embodiment" are to be read as "at least one embodiment." The term "another embodiment" is to be read as "at least one other embodiment".

In some examples, values, procedures, or apparatus are referred to as "lowest", "best", "minimum", or the like. It will be appreciated that such descriptions are intended to indicate that a selection among many used functional alternatives can be made, and such selections need not be better, smaller, or otherwise preferable to other selections.

Reference is first made to FIG. 1, in which an exemplary computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like. In some embodiments, the computer system/server 12 may communicate with DBMS (not shown) via network adapter 20.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

A database query may generally generates a file(s) such as a work file to store temporary result tables during executing the query, and such work file may be generally created to store intermediate relations and data from the database query. The size of the work file may change significantly during the execution, and thus it can be difficult for the optimizer to estimate the exact size of the work file. As a result, the optimizer always provides only one query execution plan depending on the statistics information at bind time. However, the size of the work file may change significantly during the execution of the query due to various reasons, and only one query execution plan apparently cannot be suitable for various sizes of the work file. As a consequence, the performance of the database is quite bad if the size of the work file changes significantly.

In order to at least partially solve the above and other potential problems, a new approach for generating a query execution plan for a database query is provided herein. According to embodiments of the present disclosure, a plurality of query execution plans corresponding to different file sizes can be generated for a database query. Then, a more efficient and cost effective query execution plan may be selected from the plurality of query execution plans based on the actual file size during the execution of the database query, and thus the performance of the database may be significantly improved. That is, by selecting a corresponding query execution plan based on the actual file size, the selected query execution plan can be more suitable for the database query compared to the traditional methods. Moreover, several effective ways are provided to determine whether a file size is variable, thereby determining the variability of file size more accurately and more efficiently.

Further, duplicate query execution plans are combined in order to improve the processing efficiency.

Figure 2:
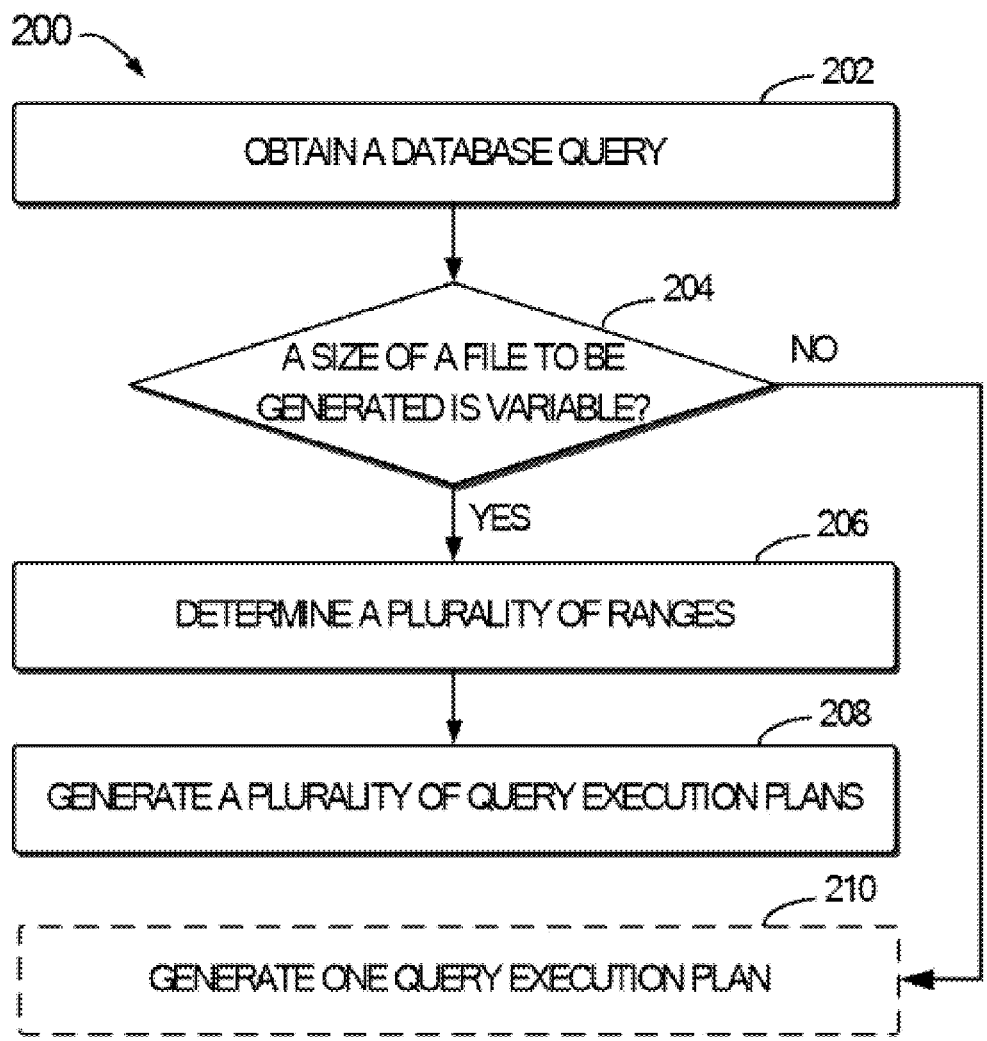
FIG. 2 is a flowchart of a method for generating a plurality of query execution plans for a database query in accordance with embodiments of the present disclosure.

As such, some embodiments may be discussed. Reference is first made to FIG. 2 which is a flowchart of a method for generating a plurality of query execution plans for a database query in accordance with embodiments of the present disclosure. As used herein, the query execution plan refers to a set of operations or a solution that the optimizer chooses to perform the query, and it may be also called as a query plan, an execution plan or an access plan.

At 202, a database query(s) is obtained. For example, a database query may be a select query, and the query may include one or more SQR statements, the types of the statement include, but are not limited to, SELECT, INSERT, UPDATE, DELETE, ALTER, DROP, CREATE, USE, SHOW, and so on.

At 204, it is determined whether a size of a file(s) to be generated during execution of the database query (for example, the work file) is variable. In some embodiments, the optimizer may determine whether the size of the work file would change significantly depending on the content involved in the database query during the bind time. Generally, a database uses table spaces in the work file for various activities such as sorting data, materializing views, sorting declared global temporary tables, expressing nested table and so forth. Optionally, the work file may be temporarily stored in the memory or cache during the execution of the database query, and it can be deleted automatically after the execution of the database query. Alternatively, the work file may be stored persistently in the storage such as a disk after the execution. Some implementations of action 204 may be discussed below with reference to FIG. 4.

If the size of the file is determined to be variable, then at 206, multiple ranges for the file size are determined. For example, the optimizer may estimate a possible total range, and the number of the ranges may depend on the total range. In some embodiments, the optimizer may select a relatively large total range based on the historical information if it is hard to estimate a reasonable total range. As such, if the optimizer is aware of the situation that the size of the work file varies in a huge range, it would provide several solutions to choose during the execution of the database query. Some implementations of action 206 are discussed below with reference to FIG. 5.

At 208, multiple query execution plans corresponding to the plurality of ranges are generated. For example, the optimizer may generate one query execution plan for each range, that is, each range has a corresponding query execution plan. In some embodiments, the query execution plan may include at least one of a join sequence for joining tables (for example, a left deep join sequence), a join method for joining the tables (such as nested loop join, sort-merge join, hash join and so on), an access method for accessing data in the tables (such as table space scan, index scan, prefetch and so on), and sort type (such as GROUP BY, ORDER BY). In some embodiments, the query execution plan may be represented as a tree-shaped structure, as is discussed below with reference to FIGS. 7A-7B.

In some embodiment, for a specific range size, the optimizer may evaluate some of the different possible query execution plans for executing the database query and returns what it considers the best option. Generally, the optimizer may generate a query execution plan for a database query without executing the database query itself. Any suitable technology, either currently known or to be developed in future, can be applied to generate a query execution plan for a specific range size of a work file.

In some embodiments, optionally, if the size of the file is determined to be invariable at 204, then at 210, only one query execution plan is generated as used in the traditional methods. As such, a plurality of query execution plans corresponding to different file sizes can be generated for a database query, and thus a more efficient and cost effective query execution plan may be selected in subsequent execution of the database query.

Figure 3:
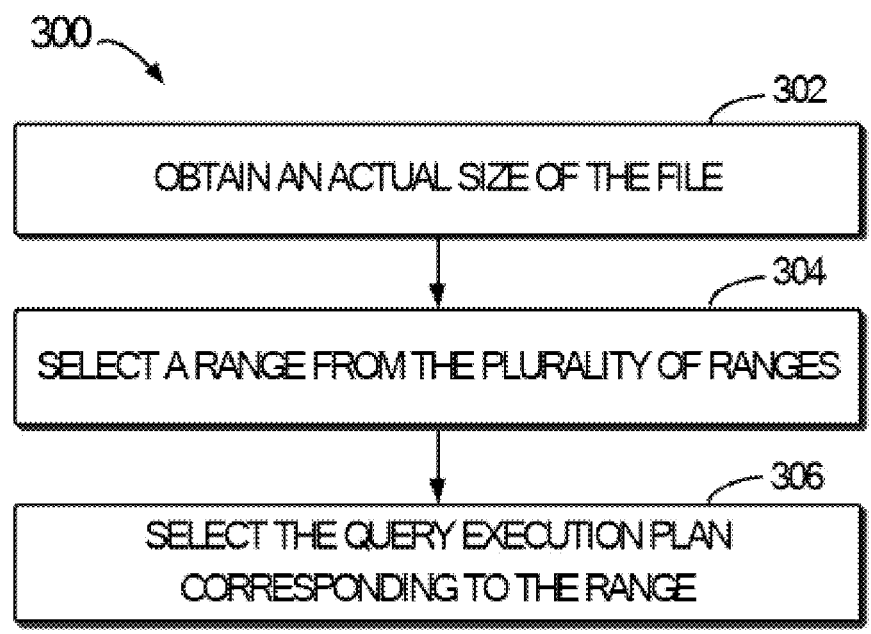
FIG. 3 is a flowchart of a method for executing a database query in accordance with embodiments of the present disclosure.

FIG. 3 is a flowchart of a method 300 for executing a database query in accordance with embodiments of the present disclosure. It is understood that the method 300 may start after generating a plurality of query execution plans in action 208 in the method 200 with respect to FIG. 2.

At 302, an actual size of the work file is obtained from runtime information of the execution of the database query. For example, the DBMS uses a SQL to execute the database query, and during the execution of the database query, the work file is actually generated. At 304, a range from the plurality of ranges is selected based on the actual size of the work file. At 306, a query execution plan corresponding to the range is selected. For example, assume the plurality of ranges includes 1-1,000 kilobytes (KB) and 1,000-100,000 KB, if the actual size is 3,600 KB, then the query execution plan that is predefined to correspond to the range of 1,000-100,000 KB is selected as a query execution plan for the database query. That is, a corresponding query execution plan may be selected from the plurality of query execution plans based on the actual size of the file during the execution of the database query.

According to the method 300 of the present disclosure, a more efficient query execution plan may be selected based on the actual file size during the execution of the database query, and thus the performance of the database may be significantly improved. That is, by selecting a query execution plan based on the actual file size, the selected query execution plan is more suitable for the database query compared to the traditional methods.

Figure 4:
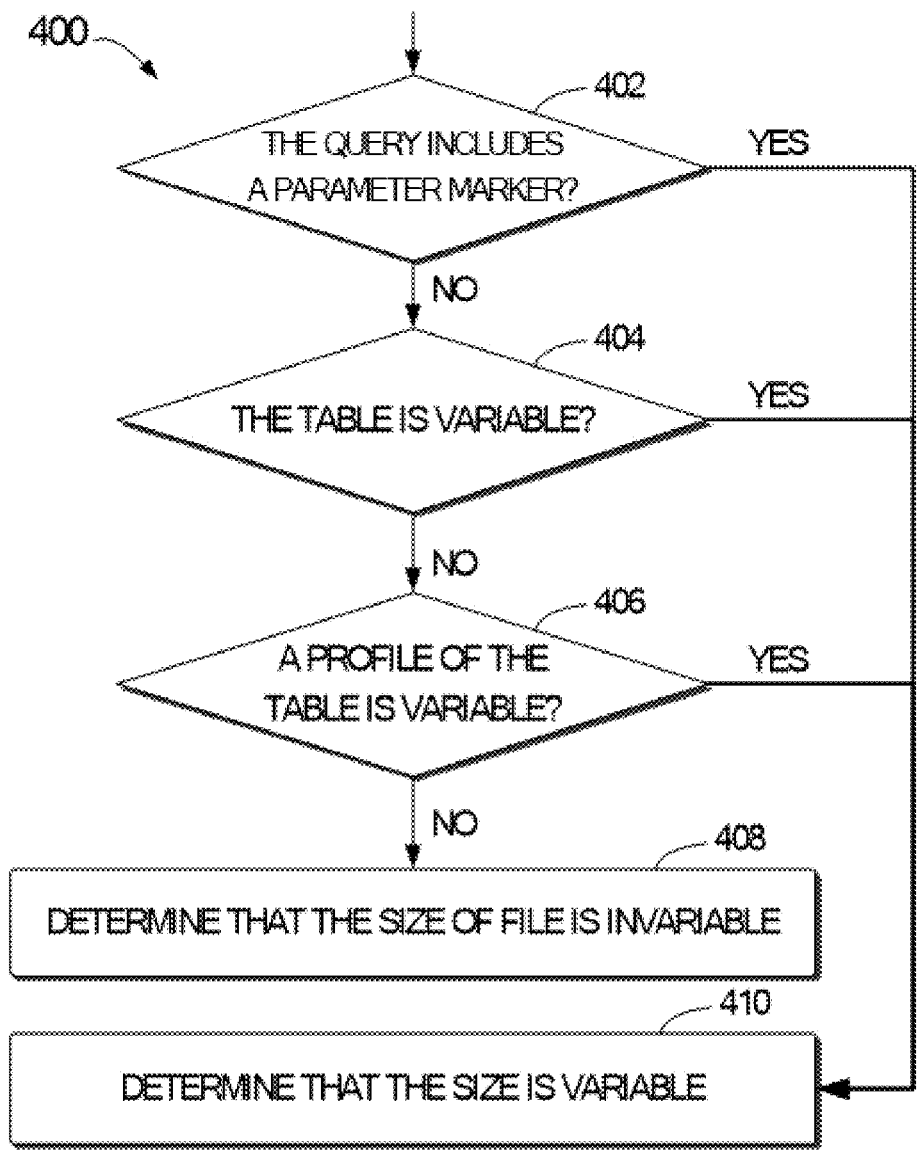
FIG. 4 is a flowchart of a method for determining variability for a file in accordance with embodiments of the present disclosure.

FIG. 4 is a flowchart of a method for determining variability for a file in accordance with embodiments of the present disclosure. It is understood that the method 400 may be regarded as a specific implementation of action 204 in the method 200 with respect to FIG. 2.

At 402, it is determined whether there is a parameter marker(s) in the database query. For example, a parameter marker is often denoted by a question mark ("?") or a colon followed by a variable name (for example, ":var1"), and the parameter marker may be a place holder in an SQL statement whose value is obtained during the execution of the database query. Since the value of the parameter marker may be variable, the result of the database query may vary significantly, and thus the size of the work file may vary significantly accordingly.

If the database query includes a parameter marker(s), then at 410, the size of the work file is determined to be variable. Otherwise, at 404, it is determined whether there is a variable table(s) involved in the database query. That is, if the table related to the database query is variable, it means that the data in the table varies frequently, and thus the size of the work file is variable accordingly. For example, if the data in a table changes frequently or continually, then the table is regarded as a variable table.

If the database query involves a variable table(s), then at 410, the size of the work file is determined to be variable; otherwise, at 406, it is determined whether there is a variable profile(s) of a table(s) involved in the database query. For example, if the statistics information for the table often changes, it means that the profile of the table may change significantly over time, and thus the size of the work file may be determined to be variable.

If there is a variable profile(s) of a table(s) involved in the database query, then at 410, the size of the work file is determined to be variable; otherwise, at 408, the size of the work file is determined to be invariable. As such, several effective ways are provided to determine whether a file size is variable, thereby determining the variability of file size more accurately and more efficiently. Although three ways for determining whether the size is variable is illustrated in the method 400, any other suitable ways, either currently known or to be developed in the future, can be applied to determine whether the size is variable.

It is to be understood that although action 402 is shown prior to actions 404 and 406, this is merely for the purpose of illustration without suggesting any limitation as to the scope of the present disclosure. In some embodiments, these actions 402-406 can be carried out in another order or in parallel. That is, it is possible to use a single instruction to perform the three actions 402-406.

Figure 5:
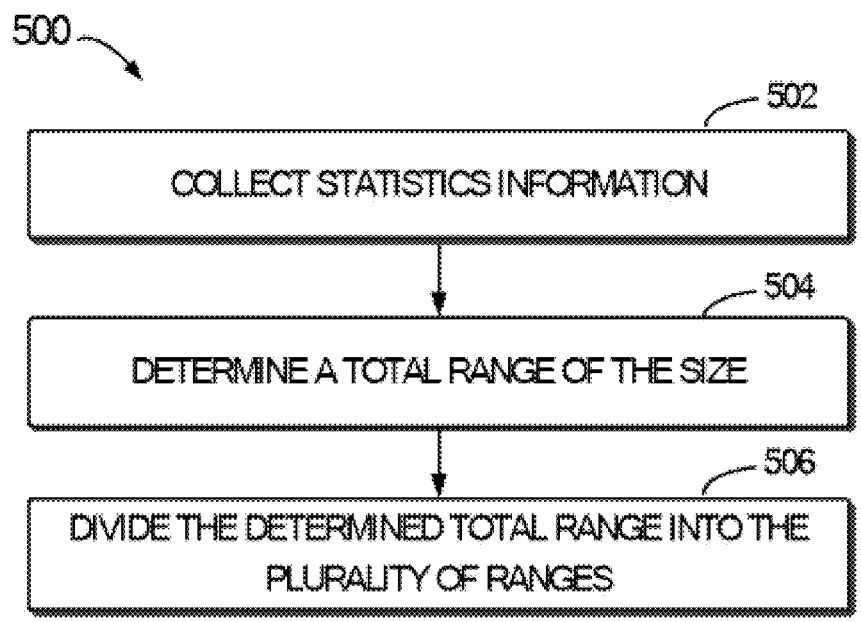
FIG. 5 is a flowchart of a method for determining a plurality of ranges for a file size in accordance with embodiments of the present disclosure.

FIG. 5 is a flowchart of a method for determining a plurality of ranges for a file size in accordance with embodiments of the present disclosure. It is understood that the method 500 may be regarded as a specific implementation of action 206 in the method 200 with respect to FIG. 2.

At 502, statistics information regarding the database query is collected. For example, the optimizer may collect statistics information such as possible values and historical information from the DBMS. Next, at 504, a total range of the size is determined based on statistics information. In some embodiments, if the optimizer hardly determines the total range, the total range may be set to a wide range based on the historical ranges. At 506, the determined total range is divided into the plurality of ranges based on a predefined rule. The predefined rule may be defined in various ways, such as predetermined length or predetermined multiple. As such, a reasonable number of ranges are determined for the size of the work file so as to provide multiple query execution plans during the execution process.

Figure 6:
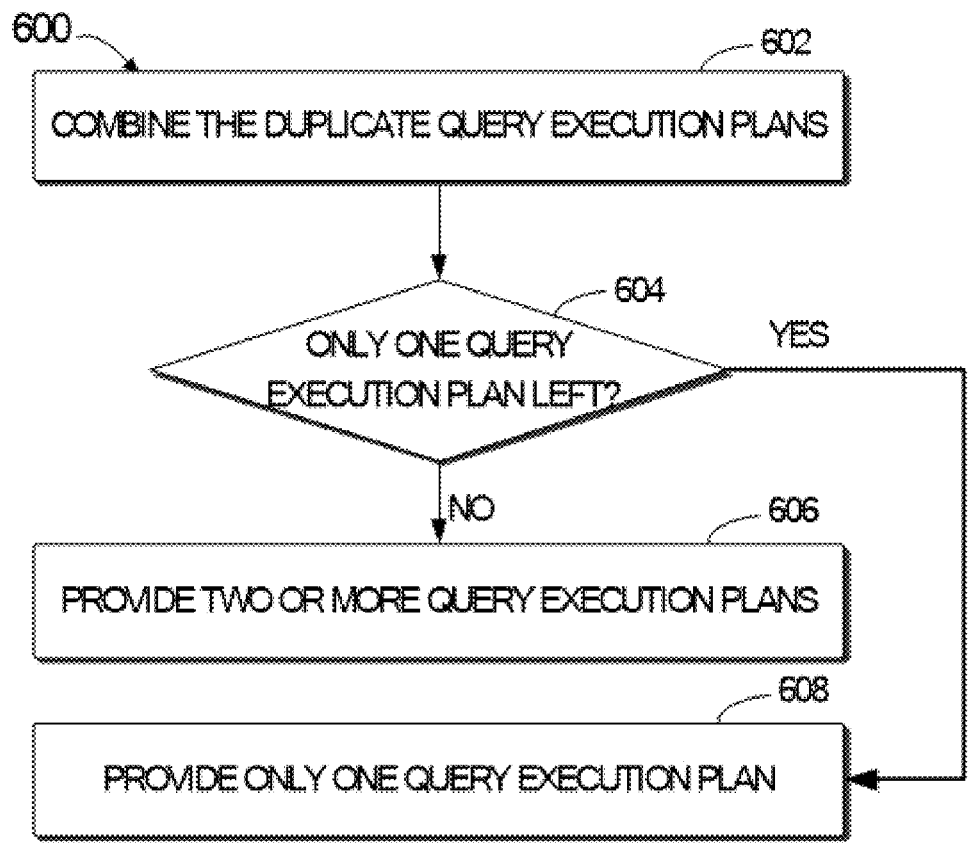
FIG. 6 is a flowchart of a method for combining duplicate query execution plans in accordance with embodiments of the present disclosure.

FIG. 6 is a flowchart of a method for combining duplicate query execution plans in accordance with embodiments of the present disclosure. The generated query execution plans may be analyzed and combined to reduce the number of the query execution plans. It is understood that the method 600 may start after generating a plurality of query execution plans in action 208 in the method 200 with respect to FIG. 2.

At 602, duplicate query execution plans are combined into one query execution plan before executing the database query in the method 300 with respect to FIG. 3. Since different ranges may correspond to a same query execution plan, optimizer would compare the generated query execution plans and make a combination for same query execution plan to reduce the number of the query execution plans and to improve processing efficiency.

At 604, after a combination of the duplicate query execution plans, it is determined whether there is only one query execution plan left. That is, it is determined whether all query execution plans are same. If not, at 606, two or more query execution plans are provided for subsequent selection during the execution of the database query; otherwise, at 608, only one query execution plan is provided as traditional methods. In this way, duplicate query execution plans are combined in order to improve the processing efficiency.

In some embodiments, a cost for each query execution plan is determined. The cost generally refers to an estimated elapsed time in seconds required to run the query execution plan on a specific hardware configuration. In some embodiments, the cost may include central processing unit (CPU) cost and/or input/out (I/O) cost, and so on. Then, computing resource for each query execution plan is configured based on the cost. That is, if a query execution plan consumes little cost, then little computing resource is configured and selected for this query execution plan, and vice versa.

Figure 7A:
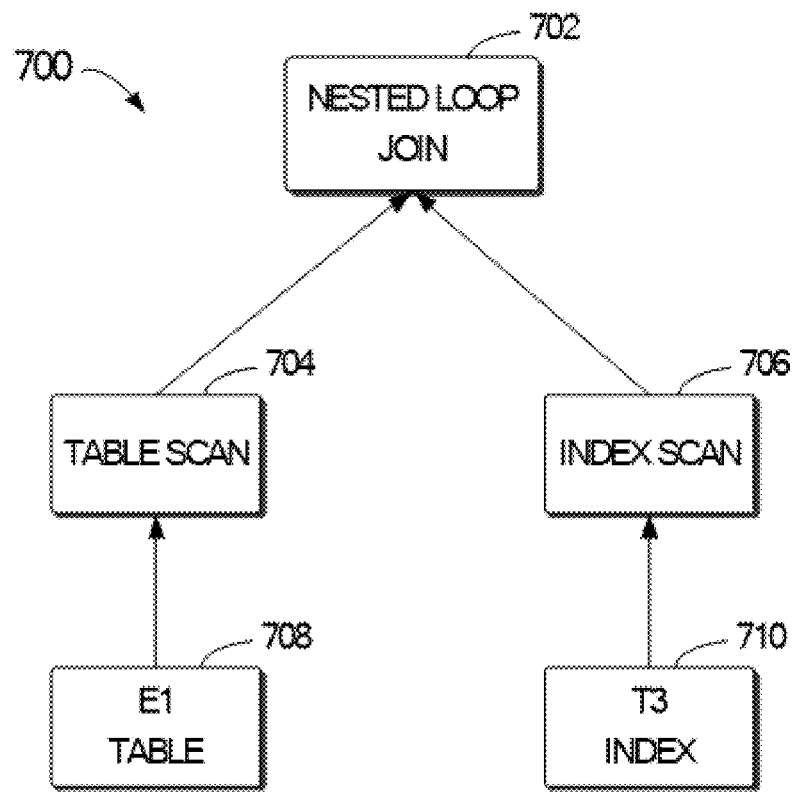
FIG. 7A illustrates an example tree representing a query execution plan in accordance with embodiments of the present disclosure.
Figure 7B:
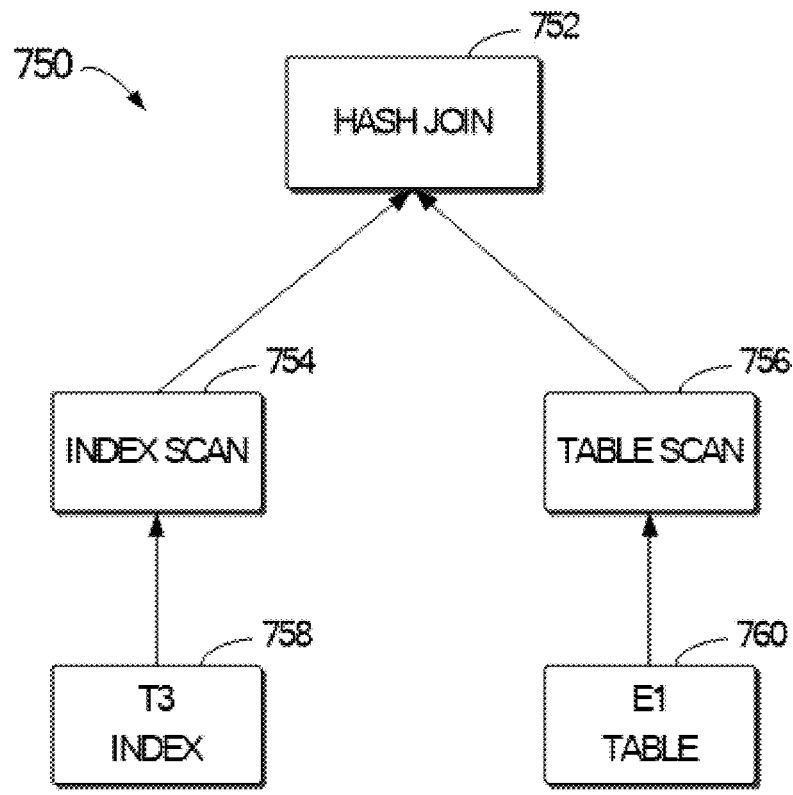
FIG. 7B illustrates an example tree representing a query execution plan in accordance with embodiments of the present disclosure.

FIGS. 7A-7B illustrate example trees representing query execution plans in accordance with the methods 200-600 of the present disclosure. Assume an example database query as below:
SELECT*
FROM
(SELECT T1.C3 AS F1, T2.C3 AS F2
FROM T1, T2
WHERE T1.C1=? AND T1.C2=T2.C1)
AS E1, T3
WHERE T3.C1=E1.F1.

Where T1, T2 and T3 denote tables, and C1, C2 and C3 denote fields of the tables. E1 represents a temporary table to be generated during the execution of the database query, and F1 and F2 are fields of the temporary table E1.

After obtaining the above example database query, the optimizer can determine the size of the work file to store the table E1 is variable because the database query includes a parameter marker "?". Then, the optimizer may determine a total range of the size of the work file as 1-1,000,000 KB, and then the optimizer may divide the total range into three ranges, that is R1 (1-10,000 KB), R2 (10,000-100,000 KB) and R3 (100,000-1000,000 KB). Next, three query execution plans are generated for the three ranges respectively, that is, plan P1 (for example, E1 join T3) corresponding to the range R1, plan P2 (for example, E1 join T3) corresponding to the range R2, and plan P3 (for example, T3 join El) corresponding to the range R3. It should to be understood that the plans P1, P2 and P3 may include other aspect(s) in addition to the join sequence and may include other join sequence (for example T1 join T2) in addition to the join sequence between E1 and T3.

For example, the plans P1 and P2 are determined to be a same query execution plan, and thus P1 and P2 are combined together into a new query execution plan P12 which is the same as P1 and P2. Accordingly, two query execution plans (that is P12 and P3) are finally provided for subsequent selection, with a first range R12 (1-100,000 KB) and a second range R3 (100,000-1,000,000 KB). As such, if the actual size of the work file generated during the execution of the database query falls into the range R12, then the query execution plan may be P12. If the actual size of the work file falls into the range R3, then the query execution plan may be P3.

As shown, FIG. 7A illustrates an example tree 700 representing the example query execution plan P12, while FIG. 7B illustrates an example tree 750 representing the example query execution plan P3. As shown in the plan P12 represented by tree 700 in FIG. 7A, if the actual size of the work file is less than 100,000 KB, then the join sequence is E1 join T3, and the access method is table scan 704 for table El 708 and index scan 706 for indexed table T3 710, and join method is nested loop join 702. Additionally, as shown in the plan P3 represented by tree 750 in FIG. 7B, if the actual size of the work file is greater than 100,000 KB, then the join sequence is T3 join E1, and the access method is index scan 754 for indexed table T3 758 and table scan 756 for table E1 760, and join method is hash join 752 which is more suitable for big dataset join.

Accordingly, according to embodiments of the present disclosure, a more efficient and cost effective query execution plan may be selected based on the actual file size during the execution of the database query, and thus the performance of the database may be significantly improved.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It is also noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A device comprising:
a processing unit;
a memory coupled to the processing unit and storing instructions thereon, the instructions, when executed by the processing unit, performing acts including:
in response to obtaining a database query, determining whether a size of a file to be generated during execution of the database query is variable;
in response to determining the size of the file is variable, determining a plurality of ranges for the size of the file wherein the determining the plurality of ranges for the size of the file comprises:
determining a total range of the size based on statistics information;
dividing the determined total range into the plurality of ranges based on a predefined rule;
generating a plurality of query execution plans corresponding to the plurality of ranges;
selecting a query execution plan of the plurality of query execution plans based on an actual size of the file; and
executing the query execution plan.

2. The device of claim 1, further comprising:
obtaining an actual size of the file from runtime information of the execution of the database query; and
selecting a query execution plan from the plurality of query execution plans based on the actual size of the file.

3. The device of claim 2, wherein the selecting the query execution plan comprises:
selecting a range from the plurality of ranges based on the actual size of the file; and
selecting the query execution plan corresponding to the range.

4. The device of claim 1, wherein the determining whether the size of the file is variable includes at least one of the group consisting of:
detecting a parameter marker in the database query;
detecting a variable table involved in the database query; and
detecting a variable profile of a table involved in the database query.

5. The device of claim 1, further comprising:
combining duplicate query execution plans into one query plan.

6. The device of claim 1, further comprising:
determining a cost for a query execution plan in the plurality of query execution plans; and configuring computing resource for the query execution plan based on the cost.

7. The device of claim 1, wherein the query execution plan includes at least one of the group consisting of: a join sequence for joining tables, a join approach for joining the tables, and an access approach for accessing data in the tables.

8. The device of claim 1, wherein a determined variable file size applies to a file where data in a table changes frequently.

9. A computer-implemented method comprising:
in response to obtaining a database query, determining whether a size of a file to be generated during execution of the database query is variable;
in response to determining that the size of the file is variable, determining a plurality of ranges for the size of the file wherein the determining the plurality of ranges for the size of the file comprises:
determining a total range of the size based on statistics information; dividing the determined total range into the plurality of ranges based on a predefined rule;
generating a plurality of query execution plans corresponding to the plurality of ranges;
selecting a query execution plan of the plurality of query execution plans based on an actual size of the file; and
executing the query execution plan.

10. The method of claim 9, further comprising:
obtaining an actual size of the file from runtime information of the execution of the database query; and
selecting a query execution plan from the plurality of query execution plans based on the actual size of the file.

11. The method of claim 10, wherein the selecting the query execution plan comprises:
selecting a range from the plurality of ranges based on the actual size of the file; and
selecting the query execution plan corresponding to the range.

12. The method of claim 9, wherein the determining whether the size of the file is variable includes at least one of the group consisting of:
detecting a parameter marker in the database query;
detecting a variable table involved in the database query; and
detecting a variable profile of a table involved in the database query.

13. The method of claim 9, further comprising:
combining duplicate query execution plans into one query plan.

14. The method of claim 9, further comprising:
determining a cost for a query execution plan in the plurality of query execution plans; and
configuring computing resource for the query execution plan based on the cost.

15. The method of claim 9, wherein the query execution plan includes at least one of the group consisting of: a join sequence for joining tables, a join approach for joining the tables, and an access approach for accessing data in the tables.

16. A computer program product being tangibly stored on a non-transient machine-readable medium and comprising machine-executable instructions, the instructions, when executed on a device, causing the device to:
in response to obtaining a database query, determine whether a size of a file to be generated during execution of the database query is variable;
in response to determining that the size of the file is variable, determine a plurality of ranges for the size of the file wherein the determining the plurality of ranges for the size of the file comprises:
determining a total range of the size based on statistics information;
dividing the determined total range into the plurality of ranges based on a predefined rule;
generate a plurality of query execution plans corresponding to the plurality of ranges;
selecting a query execution plan of the plurality of query execution plans based on an actual size of the file; and
executing the query execution plan.

17. The computer program product of claim 16, wherein the instructions, when executed on the device, cause the device to:
obtain an actual size of the file from runtime information of the execution of the database query; and
select a query execution plan from the plurality of query execution plans based on the actual size of the file.

18. The computer program product of claim 16, wherein the determining whether the size of the file is variable includes at least one of the group consisting of:
detecting a parameter marker in the database query;
detecting a variable table involved in the database query; and
detecting a variable profile of a table involved in the database query.

* * * * *